US011811766B2

(12) United States Patent
Peterson et al.

(10) Patent No.: US 11,811,766 B2
(45) Date of Patent: *Nov. 7, 2023

(54) CLOUD-BASED COORDINATION OF REMOTE SERVICE APPLIANCES

(71) Applicant: DocuSign, Inc., San Francisco, CA (US)

(72) Inventors: Donald Grant Peterson, Kirkland, WA (US); Eric Fleischman, Redmond, WA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/313,592

(22) Filed: May 6, 2021

(65) Prior Publication Data

US 2021/0258312 A1    Aug. 19, 2021

Related U.S. Application Data

(63) Continuation of application No. 16/895,123, filed on Jun. 8, 2020, now Pat. No. 11,032,284, which is a
(Continued)

(51) Int. Cl.
*H04L 29/06* (2006.01)
*H04L 9/40* (2022.01)
(Continued)

(52) U.S. Cl.
CPC .............. *H04L 63/10* (2013.01); *G06F 21/60* (2013.01); *G06F 21/602* (2013.01);
(Continued)

(58) Field of Classification Search
CPC ....... H04L 63/10; H04L 67/01; G06F 21/602; G06F 21/604
See application file for complete search history.

(56) References Cited

U.S. PATENT DOCUMENTS 8,572,695 B2   10/2013   Bailloeul et al.
8,788,809 B2   7/2014    Kelley
(Continued)

FOREIGN PATENT DOCUMENTS

WO    WO 2017132513    8/2017

OTHER PUBLICATIONS

U.S. Appl. No. 15/208,257, Response filed Oct. 1, 2018 to Non-Final Office Action dated Jun. 29, 2018, 11 pages.
(Continued)

*Primary Examiner* — Jason K Gee
(74) *Attorney, Agent, or Firm* — Shumaker & Sieffert, P.A.

(57) ABSTRACT

Systems, and methods are provided to provide cloud-based coordination of customer premise service appliances. A system can include a cloud-based service platform, which includes a coordination server and a cloud-based service appliance, and an on-premise service appliance. The coordination server is configured to establish a service session, select a service appliance, and control a sequence of operations on the selected service appliance. Establishing the service session can include establishing a service session with a first client in response to a service request received from the first client, the first client associated with an account including a service policy. Selecting the service appliance can include selecting the cloud-based service appliance or the on-premise service appliance, based on the service policy, to handle the service request. Upon selection of the on-premise service appliance, the coordination server controls a sequence of operations performed by the on-premise service appliance to satisfy the service request.

20 Claims, 13 Drawing Sheets

Related U.S. Application Data continuation of application No. 15/208,257, filed on Jul. 12, 2016, now Pat. No. 10,721,232.

(60) Provisional application No. 62/288,966, filed on Jan. 29, 2016.

(51) Int. Cl.

| | | |
|---|---|---|
| *G06F 21/60* | (2013.01) | |
| *G06F 21/62* | (2013.01) | |
| *H04L 12/46* | (2006.01) | |
| *H04L 67/01* | (2022.01) | |
| *H04L 67/63* | (2022.01) | |
| *H04L 67/10* | (2022.01) | |
| *H04L 67/141* | (2022.01) | |
| *H04L 9/32* | (2006.01) | |
| *H04L 67/02* | (2022.01) | |

(52) U.S. Cl.
CPC ............ *G06F 21/604* (2013.01); *G06F 21/62* (2013.01); *G06F 21/6218* (2013.01); *H04L 9/3247* (2013.01); *H04L 12/4625* (2013.01); *H04L 63/102* (2013.01); *H04L 67/01* (2022.05); *H04L 67/10* (2013.01); *H04L 67/141* (2013.01); *H04L 67/63* (2022.05); *H04L 67/02* (2013.01); *H04L 2463/101* (2013.01)

(56) References Cited

U.S. PATENT DOCUMENTS

| | | | |
|---|---|---|---|
| 9,268,964 | B1 | 2/2016 | Schepis et al. |
| 9,455,968 | B1 | 9/2016 | Machani et al. |
| 11,032,284 | B2 | 6/2021 | Peterson et al. |
| 11,290,457 | B2 | 3/2022 | Peterson et al. |
| 2004/0225879 | A1 | 11/2004 | Nelson |
| 2006/0272024 | A1 | 11/2006 | Huang et al. |
| 2007/0061266 | A1 | 3/2007 | Moore et al. |
| 2007/0276958 | A1 | 11/2007 | Curtis et al. |
| 2010/0250497 | A1 | 9/2010 | Redlich et al. |
| 2010/0332401 | A1 | 12/2010 | Prahlad et al. |
| 2011/0047597 | A1 | 2/2011 | Mahaffey et al. |
| 2011/0145918 | A1* | 6/2011 | Jung .................. G06F 21/552 726/22 |
| 2011/0252071 | A1 | 10/2011 | Cidon |
| 2012/0281706 | A1 | 11/2012 | Agarwal et al. |
| 2013/0219456 | A1 | 8/2013 | Sharma et al. |
| 2013/0247142 | A1 | 9/2013 | Nishizawa et al. |
| 2014/0019761 | A1 | 1/2014 | Shapiro |
| 2014/0053227 | A1 | 2/2014 | Ruppin et al. |
| 2014/0108649 | A1 | 4/2014 | Barton et al. |
| 2014/0250491 | A1 | 9/2014 | Fleischman |
| 2015/0127607 | A1 | 5/2015 | Savage et al. |
| 2015/0310188 | A1 | 10/2015 | Ford et al. |
| 2016/0050213 | A1 | 2/2016 | Storr |
| 2016/0204944 | A1 | 7/2016 | Follis et al. |
| 2017/0099344 | A1 | 4/2017 | Hadfield et al. |
| 2017/0223022 | A1 | 8/2017 | Peterson et al. |
| 2017/0223093 | A1 | 8/2017 | Peterson et al. |
| 2018/0027006 | A1 | 1/2018 | Zimmerman et al. |
| 2019/0087432 | A1 | 3/2019 | Sion et al. |

OTHER PUBLICATIONS

U.S. Appl. No. 15/208,281, Non-Final Office Action dated Apr. 11, 2018, 16 pgs.
U.S. Appl. No. 15/208,281, Response filed Jul. 11, 208 to Non-Final Office Action dated Apr. 11, 2018, 13 pgs.
International Application Serial No. PCT/US2017/015344, International Preliminary Report on Patentability dated Aug. 9, 2018, 7 pgs.
International Application Serial No. PCT/US2017/015344, International Search Report dated May 3, 2017, 4 pgs.
International Application Serial No. PCT/US2017/015344, Written Opinion dated May 3, 2017, 7 Pgs.
United States Office Action, U.S. Appl. No. 15/208,281, dated Dec. 12, 2019, 20 pages.
United States Office Action, U.S. Appl. No. 15/208,257, dated Jan. 29, 2020, 13 pages.
United States Office Action, U.S. Appl. No. 15/208,257, dated Oct. 16, 2019, 12 pages.
United States Office Action, U.S. Appl. No. 15/208,257, dated Dec. 17, 2018, 12 pages.
United States Office Action, U.S. Appl. No. 15/208,257, dated Jun. 29, 2018, 11 pages.
United States Office Action, U.S. Appl. No. 16/895,123, dated Mar. 23, 2021, 7 pages.
Prosecution History from U.S. Appl. No. 15/208,257, dated Jun. 29, 2018 through May 1, 2020, 102 pp.
Prosecution History from U.S. Appl. No. 15/208,281, dated Apr. 11, 2018 through Jul. 1, 2020, 149 pp.
Prosecution History from U.S. Appl. No. 16/895,123, dated Mar. 23, 2021 through Apr. 20, 2021, 24 pp.
Prosecution History from U.S. Appl. No. 16/910,062, dated Oct. 5, 2021 through Nov. 23, 2021, 21 pp.

* cited by examiner

CLOUD-BASED COORDINATION OF REMOTE SERVICE APPLIANCES

PRIORITY

This application is a continuation of U.S. application Ser. No. 16/895,123, filed Jun. 8, 2020, now U.S. Pat. No. 11,032,284, which is a continuation of U.S. application Ser. No. 15/208,257, filed Jul. 12, 2016, now U.S. Pat. No. 10,721,232, which application claims the priority of U.S. Provisional Application Ser. No. 62/288,966, filed Jan. 29, 2016, which application is incorporated by reference herein its entirety.

TECHNICAL FIELD

Embodiments of the present disclosure relate generally to securing end user data associated with use of a cloud-based service and, more particularly, but not by way of limitation, to cloud-based coordination of customer premise service appliances.

BACKGROUND

Delivering application software, such as customer relationship management (CRM) applications or various document management tools, has made a dramatic shift towards being provided as a rentable online service delivered over the Internet. Commonly referred to as Software as a Service (SaaS) or more recently as cloud-based services, businesses and individual users are more and more often simply logging in to a light-weight local application or a web browser that taps into a cloud-based platform to deliver the desired functionality. Even applications as common as word processing are moving towards delivery via a cloud-based platform (or at least leveraging cloud-based storage mechanism to assist with collaboration, storage, or workflow). However, cloud-based platforms cannot provide the same level of security as a completely local (e.g., within an organizations private network) application or service platform. Accordingly, organizations are increasingly concerned about data security with the increased use of cloud-based platforms and services.

For example, if a cloud-based storage system is used, the organization must trust the service provider to provide adequate safeguards and security measures to protect sensitive data stored by the provider. This lack of trust and/or controls can create a significant adoption barrier for new services. Service providers must combat this by articulating how secure their service is and attempting to prove it to customers in a myriad of ways (certifications among others).

BRIEF DESCRIPTION OF THE DRAWINGS

Various ones of the appended drawings merely illustrate example embodiments of the present disclosure and cannot be considered as limiting its scope.

Figure 1:
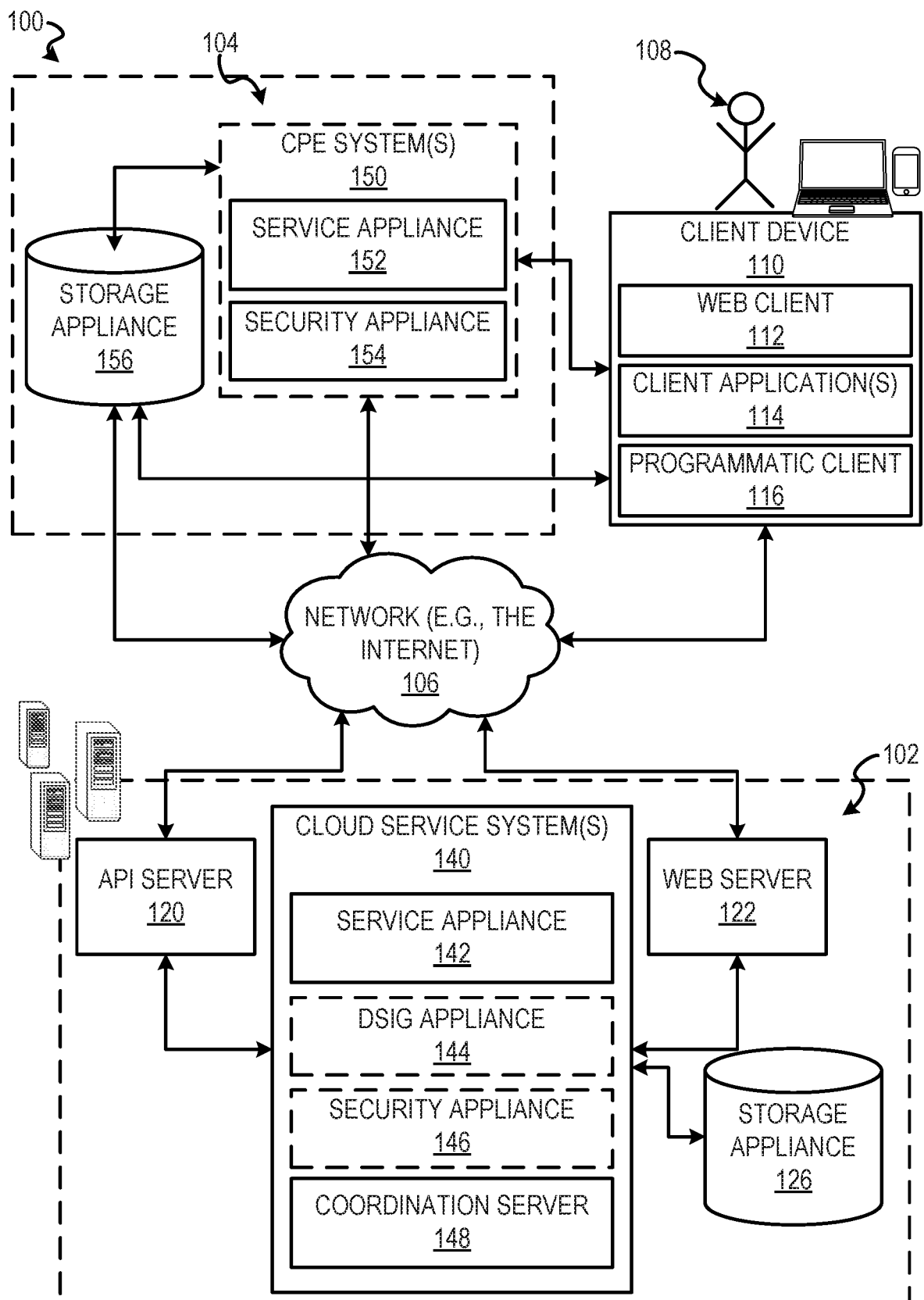
FIG. 1 is a block diagram illustrating a cloud-based platform coordinating operations with a customer premise appliance, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown or discussed in detail.

The systems, methods, techniques, instruction sequences, and computing machine program products discussed herein may utilize and expand upon technologies similar to those described in the following reference. Systems and methods for protecting data at rest and cryptographic keys are discussed in U.S. Patent Publication 2014/0250491, titled "SYSTEMS AND METHODS FOR CLOUD DATA SECURITY," which is hereby incorporated by reference in its entirety.

The present inventors have recognized, among other things, that a problem to be solved for organizations using cloud-based services includes providing these organizations a mechanism to retain complete control over data involved in, manipulated on, or generated by a cloud-based service. The systems and methods described herein provide a solution by allowing an organization to physically control and maintain a customer premise service appliance, while the cloud-based service coordinates providing the service using the customer premise service appliance. The customer premise service appliance allows an organization to maintain strict control of sensitive data that may be needed by the cloud-based service platform to provide the desired service. The present inventors have devised a mechanism for the cloud-based service platform to control and coordinate delivery of a cloud-based service through one or more customer premise service appliances. Accordingly, the organization can still receive all the benefits of using a cloud-based service provider, while also maintaining control over their own data.

Giving organizations control through the use of one or more customer premise service appliances, allows the organization a comfort level not previously possible while leveraging a cloud-based service. For example, if the cloud-based service platform is hacked or otherwise compromised, the organization can simply cut off all communications between the cloud-based service platform and their customer premise service appliances in instances where such extreme measures are warranted. Alternatively, the organization can modify encryption protocols or other security measures on the customer premise service appliances without reliance on the cloud-service provider. Organizations can also implement additional authorization mechanisms to further authenticate users for access to the local customer premise service appliances. While much of the functionality provided by the customer premise service appliances is supplied and controlled by the cloud-based service platform, administration of the device and certain security provisions are within the sole control of the end-user. The cloud-based service platform will require certain access via well-defined communication protocols, but the end-user will maintain ultimate control of the data generated and accessed by the customer premise service appliances.

In various example embodiments, a cloud-service provider can enable end-users to configure their service to be delivered across a variety of service appliance devices. The service appliance devices can include service appliances controlled and operated within the cloud-based service platform as well as customer premise service appliances, which as discussed above are controlled by the end-user. In these examples, the cloud-based service platform is configured to switch seamlessly between the service appliances available to a particular end-user based on a service policy or similar account configuration settings controlled by the end-user. As will be discussed below in detail, when any individual service request is received by the cloud-based service platform it is evaluated against a service policy associated with the end-user's account to determine across which systems the particular service request will be satisfied.

In an example cloud-based service scenario, the cloud-based service provide may provide document management services, which can include operations such as electronic signature management or end-to-end services such as sales order management. The end-user can configure the cloud-based document management service according to a variety of security levels depending upon the sensitivity of the document, status of a process or document, or the particular processes being performed. For example, in an electronic signature scenario, the end-user can configure the cloud-based document management service to handle the entire transaction within the cloud-based service platform. Alternatively, the end-user can indicate that the document is highly sensitive and configure the cloud-based document management service to perform the entire electronic signature process on the end-user controlled customer premise service appliance, while limiting the cloud-based service platform to access only encrypted documents and associated metadata. In the latter scenario, the cloud-based service platform coordinates and controls the electronic signature process, but never has access to the document (e.g., end-user data) involved in the process. The document processing is all coordinated by the cloud-based service platform, but performed on the customer premise service appliance. In certain document management processes, the target document may start out as non-sensitive, allowing for initial creation operations to be performed within the cloud-based service platform. However, during the management process the document may have sensitive information added, which changes the status of the document. Accordingly, upon such a status change, the cloud-based service platform can re-direct processing of the document to one of the user's customer premise service appliances with the cloud-based service platform no longer having un-encrypted access to the document or related sensitive information.

The cloud-based service platform can coordinate service using a variety of mechanisms, including redirection, iframes, or other similar methods. Redirection techniques can include mechanisms to reject unencrypted documents within payloads to avoid allowing visibility to any unencrypted customer data within the cloud-based service platform. Using iframes (e.g., HTML, frame element) the cloud-based service platform can maintain an active session, while redirecting a portion of the user's client (web browser) to conduct the sensitive portion of the service delivery on a customer premise service appliance. Regardless of the method of directing the user to the proper system, the cloud-based service platform coodinates the overall service delivery and maintains control of related data, such as document and metadata, though constant communication with the service appliance.

With reference to FIG. 1, an example embodiment of high-level client-server-based network architecture 100 is shown that includes details regarding a cloud-based service platform 102 and customer premise environment 104. The cloud-based service platform 102, in the example forms a network-based service delivery system, provides server-side functionality via a network 106 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, portable digital assistants (PDAs), smart phones, tablets, ultra books, net-books, laptops, multi-processor systems, microprocessor-based or programmable consumer electronics, game consoles, set-top boxes, or any other communication device that a user may utilize to access the cloud-based service platform 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the cloud-based service platform 102, such as documents and related data. One or more users 108 may be a person, a machine, or other means of interacting with client device 110. In some embodiments, the user 108 is not part of the network architecture 100, but may interact with the network architecture 100 via client device 110 or another means. For example, one or more portions of network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. The network architecture 100 may also include a large number of clients accessing various portions of the system via a variety of client devices, client 108 and client device 110 is merely illustrating a representative end-user.

Each client device 110 may include one or more applications (also referred to as "apps") such as, but not limited to, a web browser, messaging application, electronic mail (email) application, a service application (e.g., some form of service specific client-side application used to interact with the cloud-based service platform), and the like. In some embodiments, if the service application is included in a given one of the client devices 110, then this application is configured to locally provide the user interface and at least some of the functionalities with the application configured to communicate with the cloud-based service platform 102, on an as needed basis, for data and/or processing capabilities not locally available. As discussed through out, the service application, such as programmatic client 116, operating on the client device 110, operates in communication and conjunction with aspects of the cloud-based service platform 102 to deliver the cloud-based service to the end-user (e.g., user 108). In some examples, the cloud-based service platform 102 will pass responsibility for at least a portion of the service delivery to user 108 over to portions of the customer premise environment 104, which are then coordinated by the cloud-based service platform 102 to make the service delivery appear seamless to the client device 110, while providing security benefits discussed in reference to the customer premise environment 104. In certain examples, the client device 110, via the programmatic client 116, client application 114, or web client 112, may be configured to interact directly with the systems within the customer premise environment 104. In this example, the customer premise systems 150 are configured to coordinate with the cloud-based service platform 102 in the background in a manner that is transparent to the client device 110.

One or more users 108 may be a person, a machine, or other means of interacting with the client device 110. In example embodiments, the user 108 is not part of the network architecture 100, but may interact with the network architecture 100 via the client device 110 or other means. For instance, the user provides input (e.g., touch screen input or alphanumeric input) to the client device 110 and the input is communicated to the cloud-based service platform 102 via the network 106. In this instance, the cloud-based service platform 102, in response to receiving the input from the user, communicates information to the client device 110 via the network 106 to be presented to the user. In this way, the user can interact with the cloud-based service platform 102 using the client device 110.

An application program interface (API) server 120 and a web server 122 are coupled to, and provide programmatic and web interfaces respectively to, one or more cloud service systems 140. The cloud service systems 140 may host one or more service appliances 142, digital signature appliances 144, security appliances 146 and a coordination server 148, each of which may comprise one or more modules or applications and each of which may be embodied as hardware, software, firmware, or any combination thereof. The cloud service systems 140 are, in turn, shown to be coupled to one or more storage appliances 126 that facilitate access to one or more information storage repositories or database(s). In an example embodiment, the storage appliances 126 are storage devices that store information to be operated upon or otherwise used in delivery of a service by the cloud-based service platform 102.

In some example embodiments, the customer premise environment 104 can include customer premise systems 150 and a storage appliance 156 (which may represent multiple storage appliances). The customer premise systems 150 can include a service appliance 152 and a security appliance 154. In certain examples, the customer premise environment 104 may include only one or more service appliances 152 with the security and storage functions built-in or provided through other means. Other example embodiments, the customer premise environment 104 can include multiples of any of the various appliances, such as a plurality of service appliances 152 and multiple storage appliances 156, which may be geographically dispersed at different customer locations. The service appliances 152 within the customer premise environment 104 are configured to work in concert with the cloud-based service platform 102 to deliver the cloud-based service, such as a document management or transaction service, while allowing the end-user to maintain control of sensitive information. In some examples, the cloud-based service platform 102 remotely controls operation of the customer premise systems 150, and together the system deliver a service offered through the cloud-based service platform 102 using systems where the security is controlled by the end-user.

In an example, the service appliance 152 is configured (e.g., via hardware, firmware, and/or software) to communicate results of each discrete processing operation or series of operations back to the cloud-based service platform 102, such as to the coordination server 148. FIGS. 8-11 illustrate four example processing blocks and related communications between service appliance 152 and cloud service systems 140. In some examples, service coordination involves the service appliance 152 collecting, maintaining, and updating metadata describing operations performed and actors involved. The metadata as well as any revised documents or service related data is sent up to the cloud-based service platform 104 to enable central control of the service delivery. The metadata can include information to prove transaction details, such as document hashes, IP addresses, GPS locations, timestamps, payload details (e.g., # of bytes), ISP identities, or any other forensic evidence available during web or application based transactions between remote systems.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The web client 112 may access the various cloud service systems 140 via the web interface supported by the web server 122. Depending upon the requested service and/or sensitivity of the related data, the web client 112 may be redirected to the customer premise systems 150 for delivery of some or all of the requested services. After redirection, the cloud-based service platform 102 continues involvement in the delivery of service by coordinating with the customer premise environment 104 operations. However, the data associated with the portion of the service being delivered by the customer premise environment 104 is never handled or directly accessible to the cloud-based service platform 102. Similarly, the programmatic client 116 accesses the various services and functions provided by the cloud service systems 140 via the programmatic interface provided by the API server 120. The programmatic client 116 may, for example, be a sales order application to enable sales personnel to process sales orders on the cloud-based service platform 102.

Figure 2:
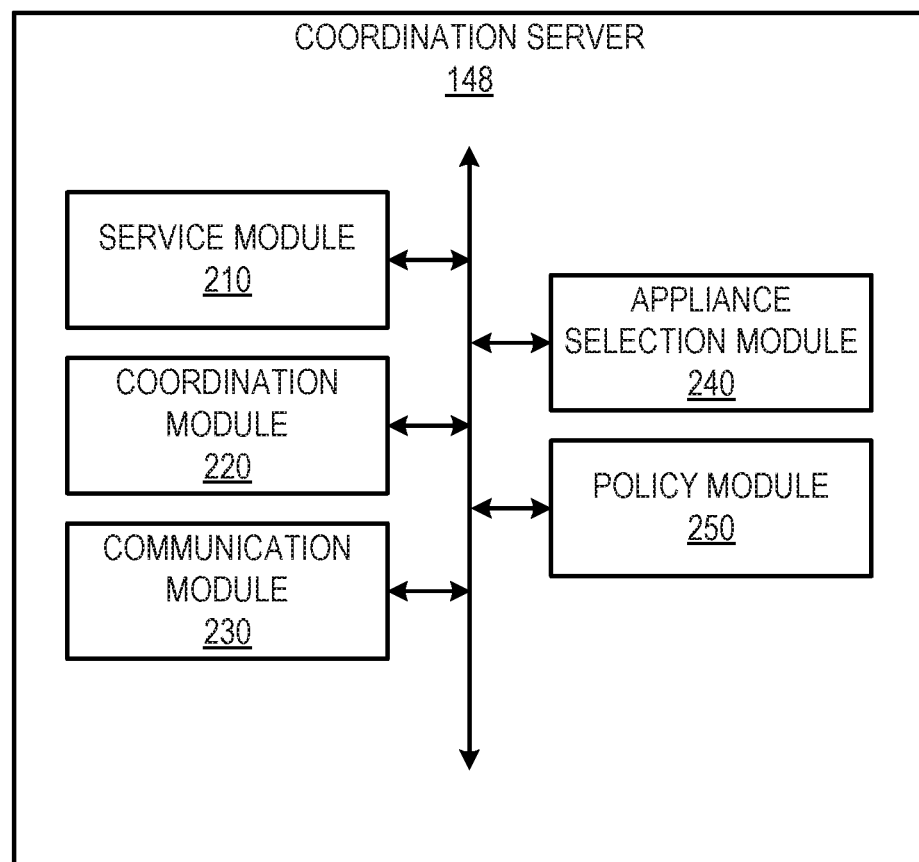
FIG. 2 is a block diagram illustrating a coordination server within a cloud-based platform, according to some example embodiments.

FIG. 2 is a block diagram illustrating a coordination server 148 within a cloud-based service platform 104, according to some example embodiments. In this example, the coordination server 148 includes a service module 210, a coordination module 220, a communication module 230, an appliance selection module 240, and a policy module 250. In other examples, the organization and makeup of modules may vary, such as the coordination module 220 may include all of the functionality provided by the appliance selection module 240.

The service module 210 can perform operations related to delivery of the service being provided by the cloud-based service platform 102. In certain examples, the cloud-based service platform 102 may provide a variety of services and the service module 210 can track these various services and different coordination requirements that the coordination service 148 may need to handle for each of the various services.

The coordination module 220 handles control and coordination operations that allow the cloud-based service platform 102 to delivery some or all of a particular service through the customer premise environment 104. The coordination module 220 will, through the communication module 230, communicate instructions to and receive information from the customer premise environment 104 throughout delivery of the service. In some examples, the coordination module 220 will maintain some form of session with at least a portion of the customer premise environment 104, such as one or more customer premise systems 150. In other examples, the appliances within the customer premise systems 150, such as the service appliance 152, operate in a stateless manner to allow each appliance to handle any in-coming request. In some examples, the cloud-based service platform 102 maintains the high-level session with any user of the cloud-based service, and coordinates performance of individual requests across the various service appliances (e.g., service appliance 142 and service appliance 152), which operate in a stateless manner.

Prior to the coordination module 220 initiating a session to control one or more of the customer premise systems 150. The appliance selection module 240 and the policy module 250 may operate to determine where the service requested by the end-user may be performed. In an example, upon receipt of a service request (or similar triggering event) by the coordination server 148 the policy module 250 accesses a policy coupled to with the user account associated with the service request. The policy can include security parameters associated with various aspects of the service(s) provided by the cloud-based service platform 102. For example, the policy may provide security levels or protocols associated with various operations to be performed on documents or similar end-user data. The policy may also include appliance selection vectors defining where different service requests are handled, such as within the cloud-based service platform 102 or on one of the customer premise systems 150.

Once the policy module 250 has accessed policy data associated with the service request, the appliance selection module 240 can evaluate the policy data to determine where the service request should be handled. The appliance selection module 240 can, using policy data and processing rules configured by the end-user, select between service appliances within the cloud-based service platform 102 and customer premise systems 150 within the customer premise environment 104 for satisfying the service request. Where the policy indicates that the service request may involve sensitive end-user data, the appliance selection module 240 will select a service appliance within the customer premise environment 104, such as service appliance 152, to perform the operations required to satisfy the request. In some examples, the appliance selection module 240 may need to select from a plurality of potential options within both the cloud-based service platform 102 and the customer premise environment 104. While the policy mechanisms can accommodate a large number of options within either the cloud-based service platform 102 or the customer premise environment 104, the appliance selection module 240 can include default processing mechanisms, such as basic load balancing, if a particular service application within a particular environment is not indicated after evaluation of the policy. Default processing will be performed within the cloud-based service platform 102, but end-users can configure the cloud-based service platform 102 to default to service appliances within the customer premise environment 104.

Figure 3:
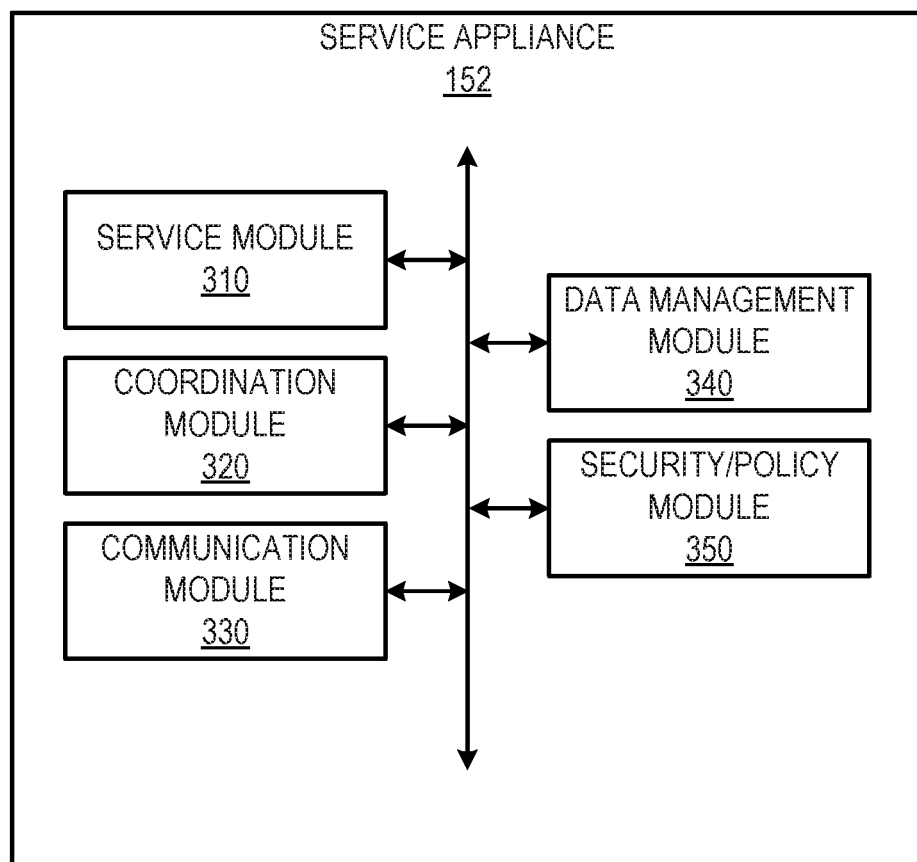
FIG. 3 is a block diagram illustrating a service appliance, according to some example embodiments.

FIG. 3 is a block diagram illustrating a service appliance 152, according to some example embodiments. In this example, the service appliance 152 includes a service module 310, a coordination module 320, a communication module 330, a data management module 340, and a security module 350. The service module 310 performs operations related to delivery of the particular service the service appliance 152 is configured to support. The service module 350 operates as directed by the cloud-based service platform 102 in conjunction with the coordination module 320 and the communication module 330. The service module 310 performs operations such as document routing, document approvals, electronic or digital signature processing, among other service related functions. As necessary, the service module 310 interacts with the data management module 340 and the security module 350 to access data and perform other security related operations.

The coordination module 320 is responsible for handling interactions with the cloud-based service platform 104, such as processing instructions received via the communication module 330 from the coordination server 148. The coordination module 320 updates the cloud-based service platform 102 regarding processes performed by the service module 310 in satisfaction of a service request. The coordination module 320 can package and communicate metadata related to service operations, such as document metadata associated with approvals or signatures. As mentioned above, metadata can include evidence to prove certain processing occurred, such as an electronic or digital signature. Metadata can include operations performed on a document, digital signature data, timestamps, cookie IDs, document hashes (or similar data verification mechanisms), IP addresses, ISP identifiers, browser information, payload details, and other peripheral data associated with the electronic transactions.

The data management module 340 is responsible for controlling and providing access to documents and related information. The data management module 340 can work with storage appliances, such as storage appliance 156 to store and retrieve data. Optionally, the data management module 340 can directly access storage repositories to access and save data operated upon by the service appliance 152.

The security module 350 is responsible for encrypting and decrypting data being operated upon by the service appliance 152. The security module 350 can act as a key management authority for managing encryption keys used to encrypt and decrypt data, such as digital documents. Optionally, the security module 350 can work with a remote key management entity to access and manage encryption keys used by the service appliance 152, as well as other systems within the customer premise environment 104. In an example, the security module 350 can communication with security appliance 154, with the security appliance 154 operating as a key manager. In some examples, key management functions are performed by a central entity for a particular end-user, with encryption and decryption keys provided by the central entity to system within both the cloud-based service platform 102 and the customer premise environment 104.

Figure 4:
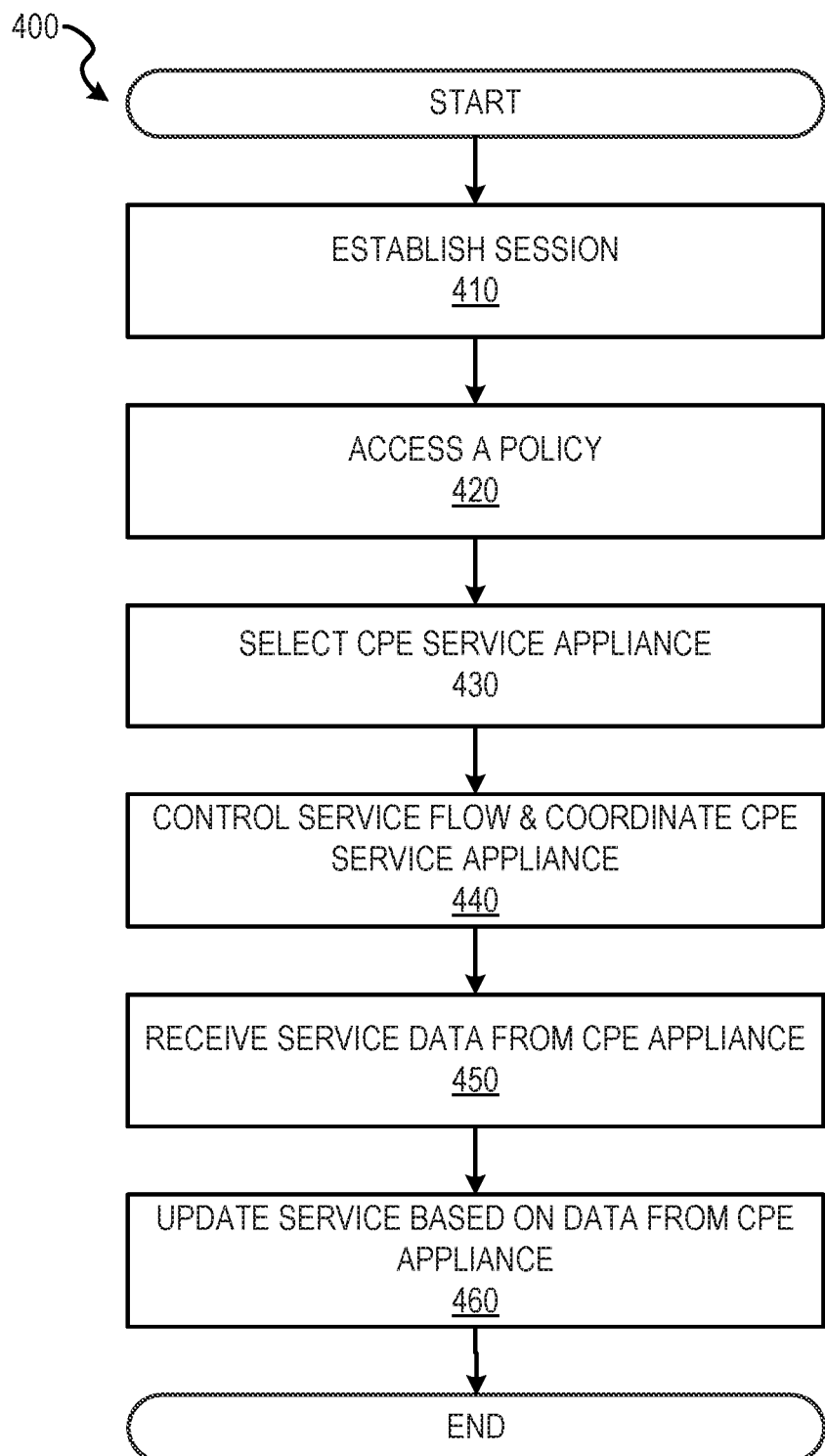
FIG. 4 is a flowchart illustrating a method for coordinating delivery of a cloud-based service via a customer premise service appliance, according to some example embodiments.

FIG. 4 is a flowchart illustrating a method 400 for coordinating delivery of a cloud-based service via a customer premise service appliance, according to some example embodiments. In this example, the method 400 includes operations such as establishing a session 410, accessing a policy 420, selecting a service appliance 430, controlling service flow 440, receiving service data 450, and updating service 460. In this example the method 400 is conducted on the coordination server 148 within the cloud-based service platform 102.

In some examples, the method 400 begins at 410 with the coordination server 148 establishing a session with a client device, such as client device 110. Establishing a session with the client device is typically triggered by receipt of a service request within the cloud-based service platform 102. A service request is typically sent by an end-user with an account on the cloud-based service platform 102 using a client device, such as client device 110. Optionally, the coordination server 148 can utilize tracking cookies or similar technologies for establishing a stateless type of session with a client device, which allows for greater flexibility in serving subsequent requests. Accordingly, the term session is used herein to broadly encompass a wide range of mechanisms for tracking a client-server relationship, such as may be established between a web-service and client running a browser or dedicated application. Regardless of the underlying technical mechanism, at 410 the coordination server 148 establishes an on-going relationship (e.g., session) with the client device to be used through the performance of the requested service. For example, the client device may be accessing the cloud-based service platform 102 to obtain electronic or digital signatures on a document. The session established at 410 can be used throughout to process of signing the document in communications with the client device. In other examples, the cloud-based service platform 102 may create an initial session to initiate service for a client device, but pass the session on to a customer premise service appliance, such as service appliance 152 to conduct a portion or all of the service request.

At 420, the method 400 continues with the coordination server 148 accessing a policy associated with the account of the end-user responsible for initiating the method 400. The coordination server 148 evaluates the service request against the policy to determine how the end-user has configured the cloud-based service platform 102 to handle the particular type of request. At 430, the method 400 continues with the coordination server 148 selecting a service appliance to perform the requested service, or at least the initial portion of the requested service. Evaluation of the policy in view of the specific request, data involved, and optionally other environmental factors will dictate whether the coordination server 148 sends the service request on to a service appliance within the cloud-based service platform 102 or one residing within the customer premise environment 104. Optionally, the policy may include sufficiently granular rules to facilitate selection of a specific service appliance within one of the environments, under certain circumstances.

At 440, the method 400 continues with the coordination server 148 controlling service flow and coordinating aspects of the service delivery being performed on service appliances within the customer premise environment 104. When the coordination server 148 selects a service application, such as service appliance 152, within the customer premise environment 104, control and coordination of the cloud-based service remains within the cloud-based service platform 102. The coordination server 148 operates to maintain the outward appearance of a service being delivered via the cloud-based service platform 102, while allowing a portion (or optionally all of) the service to be performed within the end-user's environment, such as customer premise environment 104. In some examples, the coordination server 148 hands off the performance of the service request in total to a customer premise service application, such as service appliance 152. In such an example, the service appliance 152 can require additional authentication or otherwise provide clear indicators that the client is now being served within a different environment. However, even when the coordination server 148 hands off operations to service appliance 152, the service appliance 152 continues to update the cloud-based service platform 102 by providing metadata updates and at least encrypted versions of documents related to performance of the service request.

At 450, the method 400 continues with the coordination server 148 receiving over the network 106 data resulting from performance of service operations within the customer premise environment 104. Optionally, the coordination server 148 can receive metadata, completed documents, information confirming electronic or digital signatures, and updates to service status, among other things back from the service appliances operating within the customer premise environment 104. At 460, the method 400 can complete with the coordination server 148 updating databases, configurations, or other structures controlling service delivery within the cloud-based service platform 102 based on information received from the customer premise environment 104.

Figure 5:
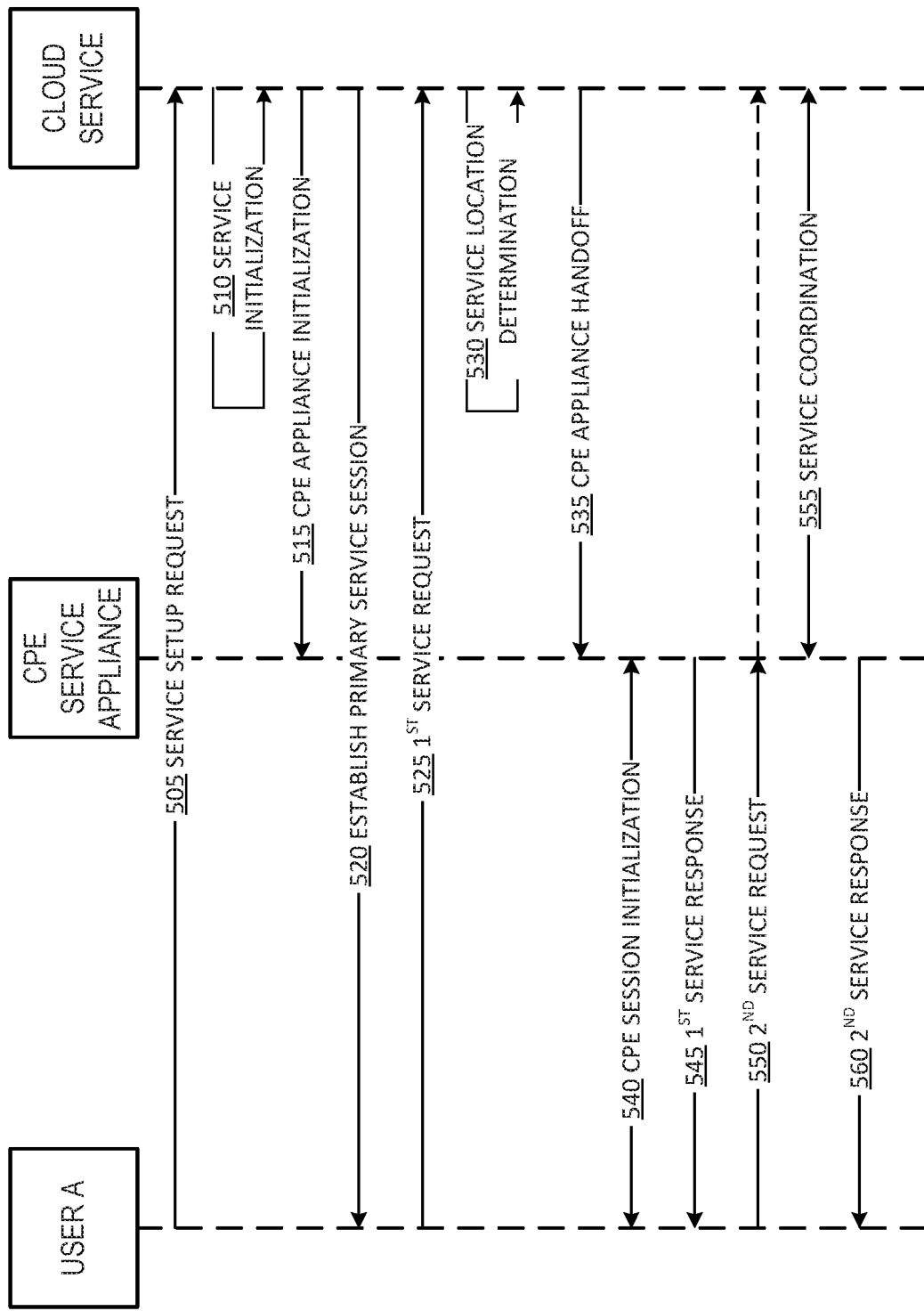
FIG. 5 is a swim lane flow diagram illustrating interactions between various entities delivering a cloud-based service, according to some example embodiments.

FIG. 5 is a swim lane flow diagram illustrating a method 500 with interactions between various entities delivering a cloud-based service, according to some example embodiments. In this example, the method 500 includes operations such as sending/receiving a service setup request 505, service initialization 510, service appliance selection/initialization 515, establishing a primary service session 520, receiving a first service request 525, determining a service location 530, service appliance handoff 535, service appliance session initialization 540, sending/receiving a service response 545, sending/receiving a second service request 550, conducting service coordination 555, and sending/receiving a second service response 560. The method 500 is illustrated in FIG. 5 as operation flows between User A (e.g., user 108 operating client device 110), a CPE service appliance (e.g., service appliance 152, and a cloud service (e.g., cloud-based service platform 102, coordination server 148). In other examples, processes similar to method 500 could be implemented across a variety of devices within the customer premise environment 104 and the cloud-based service platform 102, such as multiple customer premise service appliances and multiple systems with in the cloud-based service platform 102.

In this example, the method 500 begins at 505 with the user 108 sending a service setup request (or simply service request) from the client device 110 to the cloud-based service platform 102. At 510, the method 500 continues with the cloud-based service platform 102 initializing service according to the service request. Initializing the service can involve evaluating the service request against a policy registered in an account associated with user 108. After evaluating the policy, the cloud-based service platform 102 selects one or more service appliances to perform operations to satisfy the service request. In this example, the cloud-based service platform 102 selects a service appliance, such as service appliance 152, within the customer premise environment 104. Optionally, the method 500 could operate in a similar manner with a different service appliance selection. In some examples, the cloud-based service platform 102 can initialize a number of service appliances, such as service appliance 142 and service appliance 152, which allows for different subsequent service requests to be distributed between service appliances within the cloud-based service platform 102 and service appliances within the customer premise environment 104. Method 500 is only illustrated using a single service appliance within the customer premise environment 104.

At 515, the method 500 continues with the cloud-based service platform 102 sending initialization commands to the service appliance 152. At 520, the method 500 continues with the cloud-based service platform 102 establishing a session with the user 108, which allows the user 108 to reply with further requests, such as a first service request at 525. Upon receipt of the first service request at 525, the method 500 continues at 530 with the cloud-based service platform 102 evaluating the service request to determine where it should be performed, which will typically involve a primary decision between using a service appliance with the cloud-based service platform 102 or one hosted within the customer premise environment 104. As discussed herein, a coordination service 148 can access the policy and evaluate the service request against the policy to select a service appliance. Once a service appliance is selected, the method 500 continues at 535 with the cloud-based service platform 102 handing off to service appliance 152 to perform operations to satisfy the service request.

At 540, the method 500 continues with the service appliance 152 initializing a session with the user 108. The method 500 then proceeds to 545, with the service appliance 152 providing a first service response to the user 108 (operating client device 110). At 550, the method continues with the user 108 via client device 110 sending a second service request directly to the service appliance 152. Optionally, the second service request at 550 can be sent up to the cloud-based service platform 102, which in turn passes the second service request back over to the service appliance 152, unless a change in operation location is indicated due to a change in document status or change in operational conditions warrant a change in operating location.

In this example, the method 500 continues at 555 with the cloud-based service platform 102 coordinating service operation with the service appliance 152. The part of method 500 is an example of the cloud-based service platform 102 coordinating and controlling the cloud-based service despite service operations being performed on service appliance 152 within the customer premise environment 104. After the service coordination at 555, the method 500 can conclude with the service appliance 152 delivering a second service response to client device 110 for user 108.

Figure 6:
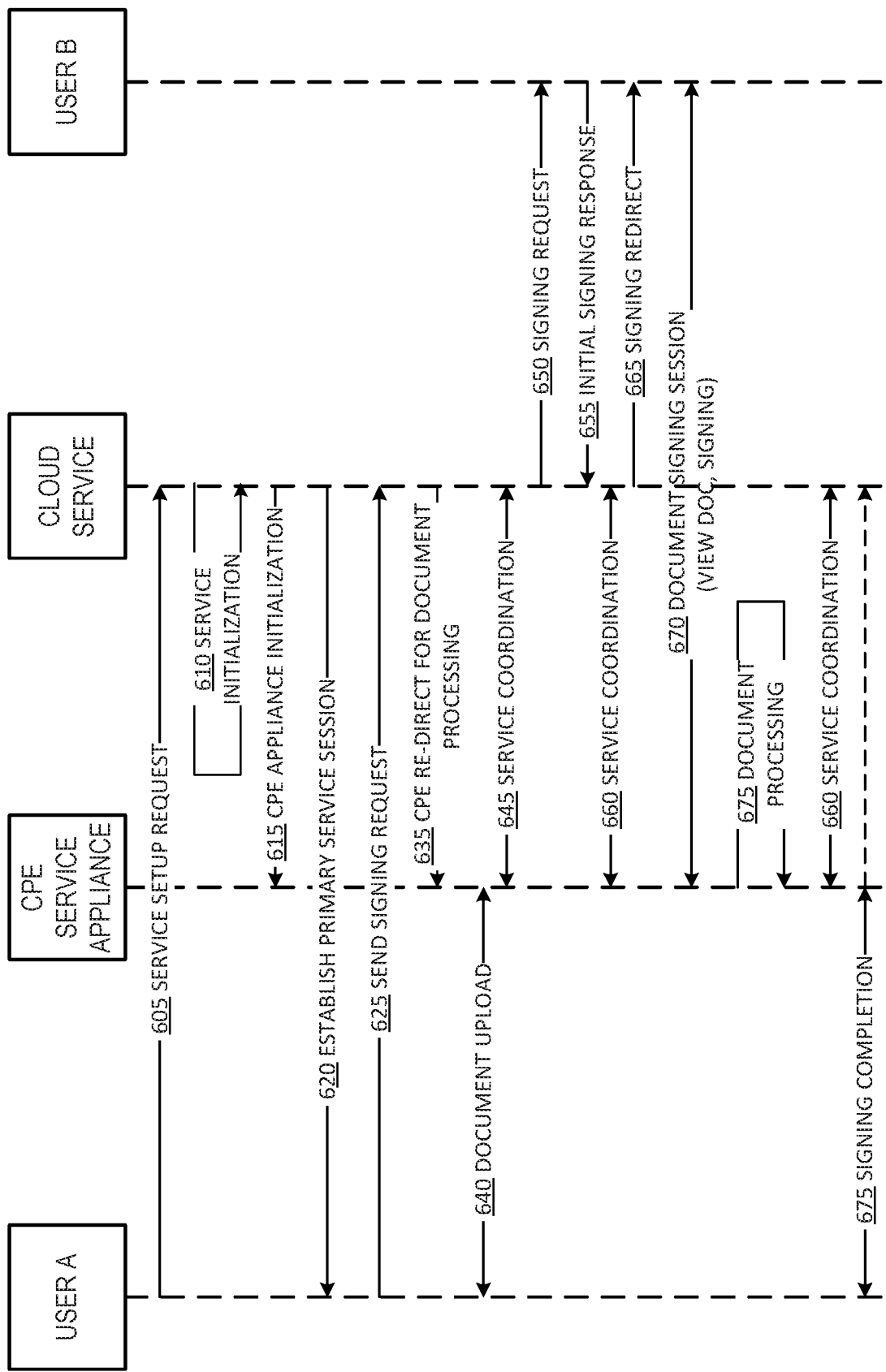
FIG. 6 is a swim lane flow diagram illustrating interactions between various entities delivering a cloud-based document management service, according to some example embodiments.

FIG. 6 is a swim lane flow diagram illustrating method 600 involving interactions between various entities delivering a cloud-based document management service, according to some example embodiments. In this example, the method 600 includes operations to perform a electronic or digital signature process on a customer sensitive document, the operations include: sending/receiving service set up requests 605, conducting service initialization 610, conducting service appliance initialization 615, establishing primary service session 620, sending/receiving signing request 625, redirecting to service appliance for document processing 635, document upload 640, conducting service coordination 645, sending/receiving signing request 650, sending/receiving initial signing response 655, conducting service coordination 660, signing redirection 665, conducting document signing session 670, processing document 675, conducting service coordination 660, and completing the signing process 675. This example illustrates the method 600 occurring between a variety of entities including a first user (User A), such as user 108, a service appliance, such as service appliance 152, a cloud service provider, such as cloud-based service platform 102, and a second user (User B). The users (User A and User B) in the illustrated method 600 can both access the cloud service via client devices, such as client device 110. The discussion of method 600 will use the illustrated convention of User A and User B in reference to the users involved in the method. In the discussion that follows mentions of User A or User B performing operations imply that those operations occur through the use of a client device, such as client device 110, using a web client 112 or a client application 114.

In this example, the method 600 can begin at 605 with User A initiating a service request by sending a service request to the cloud service (cloud-based service platform 102). At 610, the method 600 continues with the cloud-based service platform 102 initializing systems to handle the service request received from User A. As discussed in detail in other portions of this document, service initialization can include accessing a policy associated with User A's account and selecting a service appliance to perform at least the initial portion of the requested service. Once initialization is complete, the method 600 continues at 615 with the cloud-based service platform 102 sending a service appliance initialization request to the service appliance (such as service appliance 152). The service appliance 152 receives the initialization request and performs appropriate operations to setup to handle providing service.

At 620, the method 600 continues with the cloud-based service platform 102 establishing a primary session with User A. At 625, the method continues with User A sending a request to the cloud-based service platform 102 to collect electronic or digital signatures on a document. In this example, the signatures are collected from User B. However, the method 600 can be extended to collect signatures from any number of users, such as both User A and User B, through operations similar to those illustrated in FIG. 6.

At 625, the method 600 continues with the cloud-based service platform 102 receiving the request to obtain electronic/digital signatures on a document. Upon receipt of the signing request at 625, the method 600 next involves the cloud-based service platform 102 determining where the signing request will be handled. In this example, the service appliance 152 within the customer premise environment 104 will handle the request to avoid unnecessarily sharing document data with the cloud-based service platform 102. At 635, the method 600 continues with the cloud-based service platform 102 redirecting the signing request to the service appliance 152 for processing. In some examples, the redirection to the service appliance at 635 will include a message or communication to User A to redirect follow up communications directly with the service appliance 152. In other examples, primary service communications will continue between cloud-based service platform 102 and User A, with only certain operations, such as document handling tasks (e.g., upload, edit, save, and presentation).

At 640, the method 600 continues with User A uploading the document for signatures to the service appliance 152. In this example, the document is uploaded directly to the service appliance within the customer premise environment 104 to enable User A (or User A's organization) to maintain control over the document and avoid providing direct access to the cloud-based service platform 102. The method continues at 645 with the service appliance 152 and the cloud-based service platform 102 conducting service coordination activities, such as indication of receipt and processing of the document to be signed. At 650, the method 600 continues with the cloud-based service platform 102 sending a signing request to User B. For User B's perspective, the signing request originates from the cloud-based service. At 655, the method 600 continues with User B sending an initial signing request response to the cloud-based service platform 102. Upon receipt of the initial signing response at 655, the method continues at 660 with additional service coordination between the cloud-based service platform 102 and the service appliance 152. Subsequently, the method 600 continues at 665 with the cloud-based service platform 102 sending a signing redirection instruction to User B, which causes the client device used by User B to redirect communications involved in the signing process to the service appliance 152. At 670, the method 600 continues with a signing session between the service appliance 152 and User B. The signing session can involve document presentation to User B, typically through presentation of a rasterized version of the document with limited editable content along with signature and initial blocks to collect signatures and initials in the required locations from User B.

Upon completion of the signing process between service appliance 152 and User B, the method 600 continues at 675 with the service appliance processing the document and related signature data to memorialize the signature process. Document processing can include application of a digital signature to security and validate the process conducted by the service appliance 152. At 660, the method 600 continues with further service coordination between the service appliance 152 and the cloud-based service platform 102. This coordination can include uploading a completed document package that can include encrypted version of the documents, electronic or digital signatures, and related metadata. Finally, at 675, the method 600 can conclude with the service appliance 152 or optionally the cloud-based service platform 102 communicating with User A the results of the signature process conducted with User B.

Figure 7:
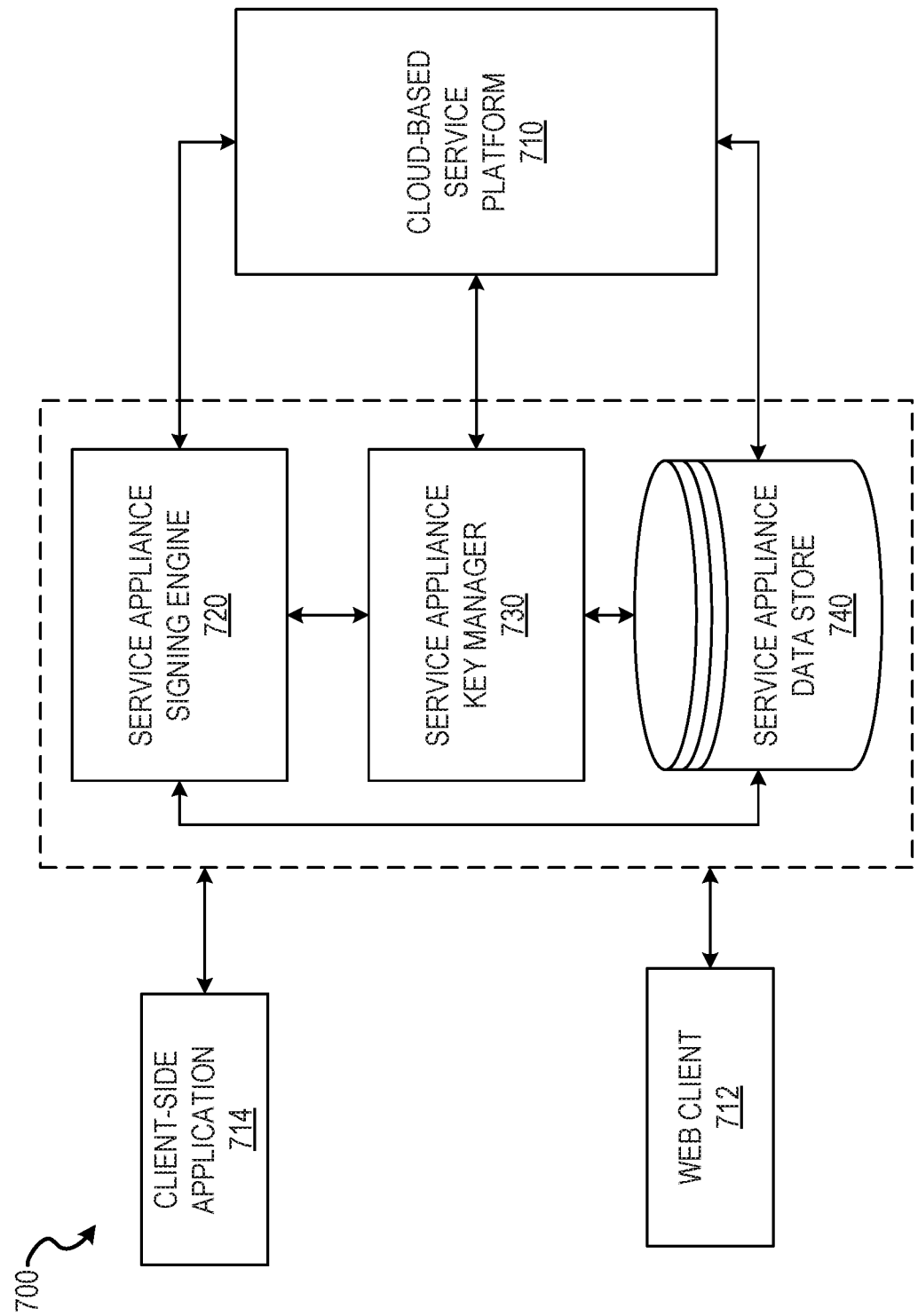
FIG. 7 is a block diagram illustrating a system including a service appliance coordinated via a cloud-based platform, according to some example embodiments.

FIG. 7 is a block diagram illustrating a system 700 including a service appliance (720, 730, and 740) coordinated via a cloud-based platform 710, according to some example embodiments. In this example, system 700 includes a cloud-based service platform 710, a web client 712, a client-side application 714, a service appliance signing engine (SA:SE) 720, a service appliance key manager (SA: KM) 730, and a service appliance data store (SA:DS) 740. This example simplifies the illustration of the cloud-based service platform 710 and breaks the service appliance into three functional blocks that may represent separate computing systems or all be run on a single system. The system 700 is used to illustrate four common service operations coordinated between the cloud-based service platform 710 and a service appliance (within a customer premise or within the cloud-based platform). The SA:SE 720, SA:KM 730, and SA:DS 740 represent three processing blocks with defined tasks, a system with a different focus may include more or fewer processing blocks. The three processing blocks included in system 700 illustrate a method of separating tasks to increase security and provide end-users with control over data being operated on by the cloud-based service.

In this example, the service appliance signing engine 720 provides functionality to enable application of electronic or digital signatures to documents within a broader document transaction or management process, or within a process focused on enabling distributed electronic signing of documents. The SA:SE 720 performs operations such as document presentation, document encryption/decryption, application of electronic or digital signatures, initial document processing, and maintenance of associated metadata. The SA:SE 720 coordinates all document signing actives with the cloud-based service platform 710 to provide a secure distributed signing platform. One of the key functions of the SA:SE 720 is to collect data for use in proving authenticity of electronic or digital signatures, as well as content of the signed document, and to provide this information to the cloud-based service platform 710 for later use in verifying document signing. Ensuring transactional integrity involves a balance of enabling convenience, while maintaining sufficient control and oversight. Proving document content can be done through techniques such as digital signatures, hashing, or similar document data manipulations. Other transactional information that can be collected and later used in validating document signatures can include IP addresses, ISP identities, payload details, authentication tokens (or similar artifacts), timestamps, and location information (GPS, Browser locals, etc. . . . ). Metadata such as this can then be stored with an encrypted version of the document to establish a picture of the signing process as coordinated by the cloud-based service platform 710 and conducted on the SA:SE 720.

In this example, the service appliance key manager 730 manages encryption keys for use by the SA:SE in encryption and decryption of documents being processed through the distributed signature system hosted by the cloud-based service platform 710. As illustrated in FIGS. 8-11, the SA:KM 720 in conjunction with the SA:SE 720 prevent any unencrypted user data from being available to the cloud-based service platform 710, at least as dictated by the end-users security policy managed within the cloud-based service platform 710.

In this example, the service appliance data store 740 is used to store encrypted and decrypted user data, such as documents being processed for signatures. As discussed in more detail below, the SA:DS 740 interacts with the SA:SE 720 to store documents in process, and may also interact with the cloud-based service platform 710 to store encrypted data.

Figure 8:
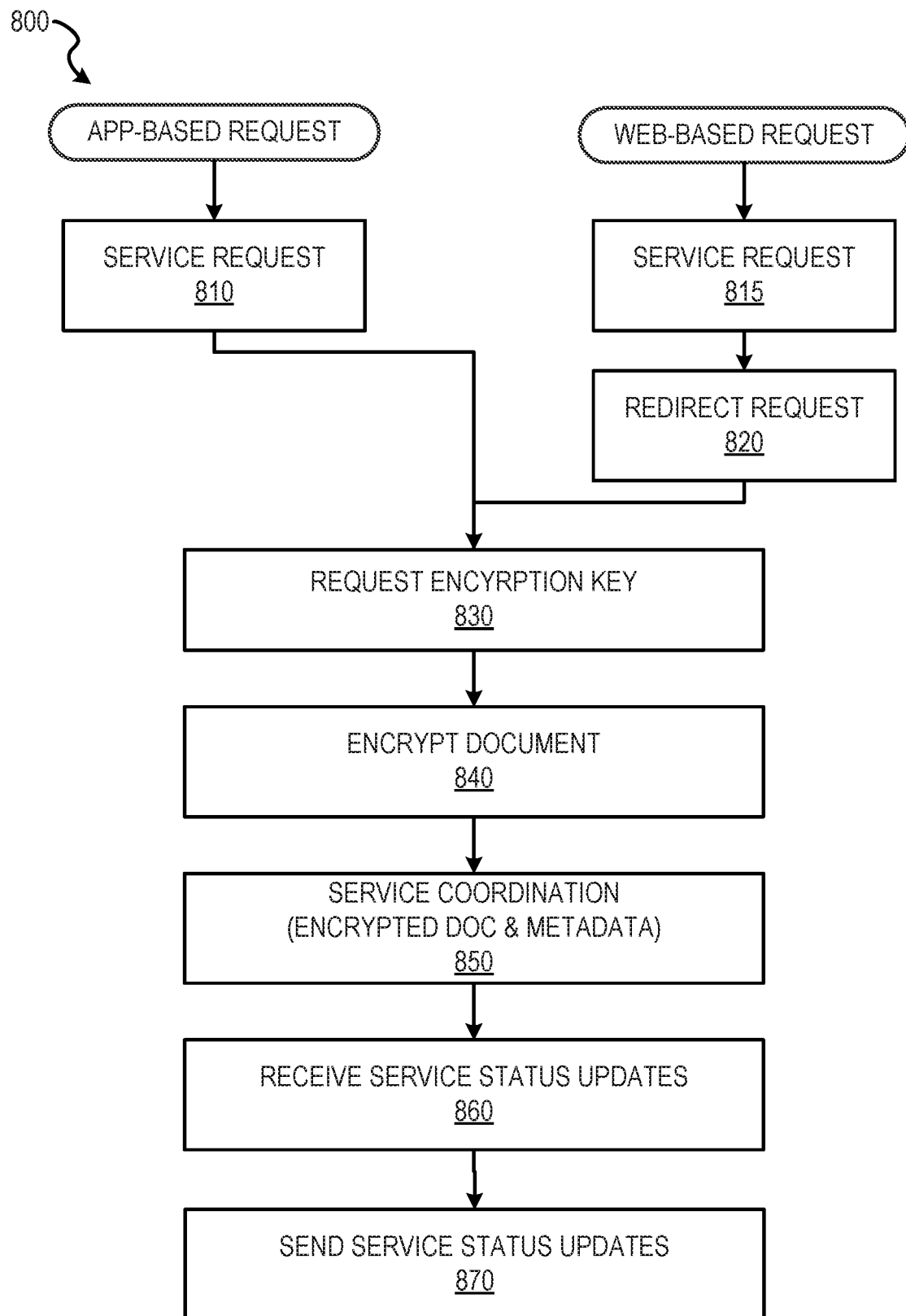
FIG. 8 is a flowchart illustrating a service initiation process with a cloud-based service, according to some example embodiments.

FIG. 8 is a flowchart illustrating a service initiation process 800 with a cloud-based service, according to some example embodiments. The service initiation process 800 can include operations such as service request at 810 or 815, redirection of service request at 820, requesting encryption key at 830, encrypting document at 840, coordinating service at 850, receiving service status updates at 860, and sending service status updates at 870. In this example, the service initiation process 800 can be triggered by an app-based service request 810 or a web-based service request 815. The app-based service request 810 can be received directly by the SA:SE 720, as the application running on the client device can be configured with knowledge of the service appliance. In contrast, the web-based service request 815 is received on the cloud-based service platform 710, and the process 800 continues at 820 with the cloud-based service platform 710 redirecting the request to the SA:SE 720 for processing. In certain examples, the redirecting the request at 820 can include the cloud-based service platform evaluating the service request against a security policy to determine whether to handle the service within the cloud-based service platform 710 or redirect it to the SA:SE 720. In some example, if the web-based service request at 815 includes a document, at least the document payload will be rejected by the cloud-based service platform 710 to avoid any unencrypted user data from being available to the cloud-based service platform 710.

Once the SA:SE 720 receives the service request and associated document, the process 800 continues at 830 with the SA:SE 720 requesting an encryption key from SA:KM 730. At 840, the process 800 continues with the SA:SE 720 encrypting the document. In certain examples, the SA:SE 720 also performs other processing operations on the document to prepare the document and generate associated metadata for use in the signing process. Initial document processing can include identifying signature blocks and initialing locations through out the document and updating document metadata to include locations.

At 850, the process 800 continues with the SA:SE 720 coordinating service delivery with the cloud-based service platform 710. Service coordination can include sending an encrypted version of the document and associated metadata to the cloud-based service platform 710. Service coordination can also include receiving additional processing instructions, security policy information, status updates, and other service related information. At 860, the process 800 continues with the SA:SE 720 receiving service status updates from the cloud-based service platform 710. The status updates can include verification that the encrypted document and metadata were received, as well as service status updates that may affect how or where future operations associated with service delivery are performed.

At 870, the process 800 completes with the SA:SE 720 sending service updates to the client device. The SA:SE 720 will communicate service status updates via client-side application updates or web-based (e.g., browser) updates, depending on how the client initiated the service request.

Figure 9:
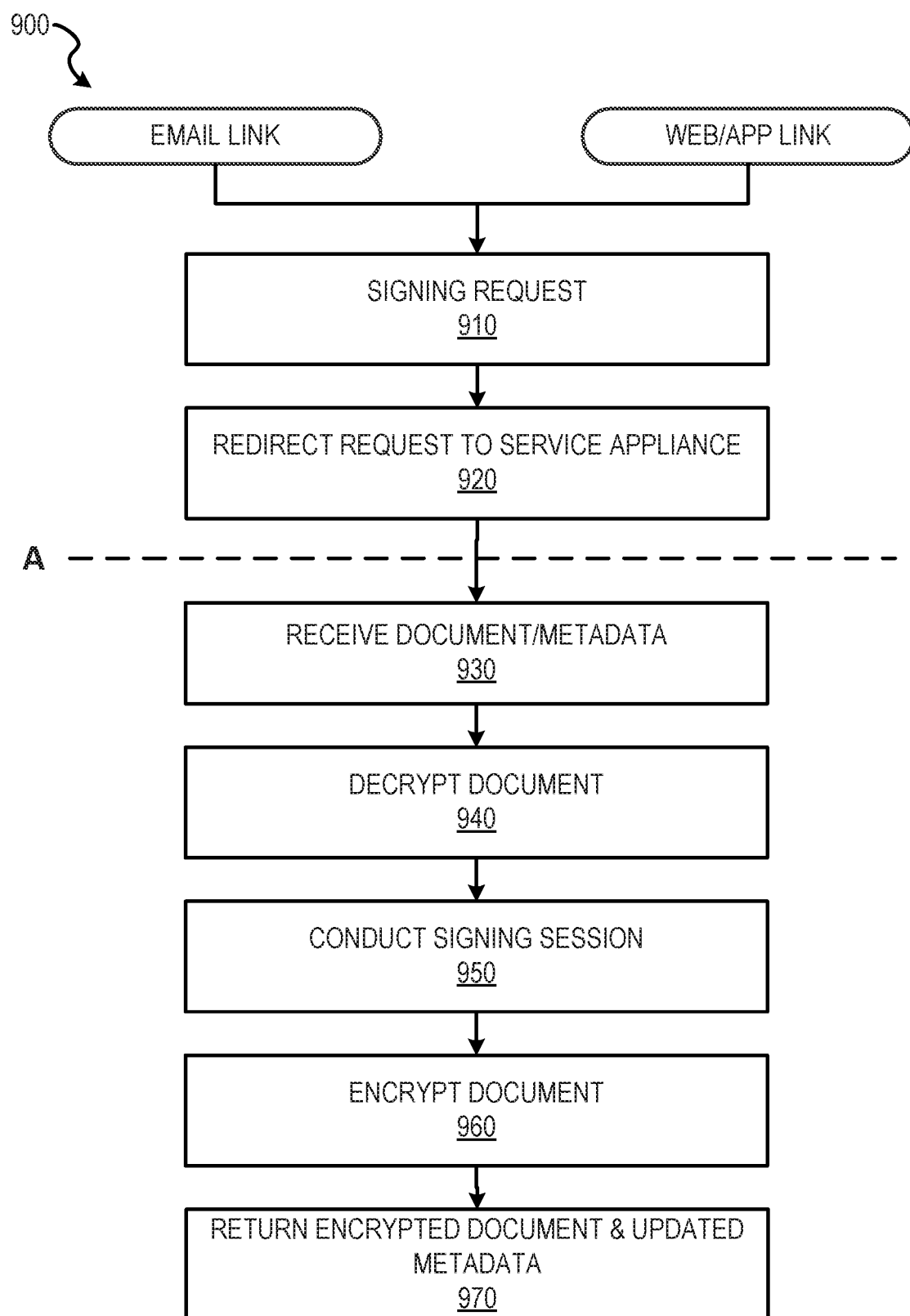
FIG. 9 is a flowchart illustrating a document signature process with a cloud-based service, according to some example embodiments.

FIG. 9 is a flowchart illustrating a document signature process 900 with a cloud-based service, according to some example embodiments. In this example, the process 900 includes operations such as receiving a signing request at 910, redirecting the signing request at 920, receiving document and metadata at 930, decrypting the document at 940, conducting signing session at 950, encrypting the document at 960, and returning encrypted document and updated metadata at 970. In some examples, the process 900 is performed across multiple system, such as starting on the cloud-based service platform 710 and transitioning to a service appliance, such as SA:SE 720. As illustrated in FIG. 9, operations above the "A" line can be performed by the cloud-based service platform 710. In other examples, the client device, such as client device 110, may access the signing process via a client application 114 configured to initiate the signing process directly with the SA:SE 720.

At 910, the process 900 begins with the cloud-based service platform 710 receiving a signing request initiated via an email link or web/application link activated by on a client device. In this example, the link takes the client device (application or browser) to the cloud-based service platform 710 to start the signing process. In certain examples, the cloud-based service platform 710 may have sent an email to a user to request an electronic or digital signature on a particular document. In other examples, the SA:SE 720 sending out the email with links directly back to the SA:SE 720, thus avoiding direct interaction with the cloud-based service platform 710.

At 920, the process 900 continues with the cloud-based service platform 710 determining that the signing request should be redirected to the SA:SE 720. As discussed elsewhere, determining where a signing request is performed can include evaluation of the request and involved document against a security policy. At 930, the process 900 transitions with the SA:SE 720 receiving the redirected signing request along with an encrypted version of the document to be signed and associated metadata. At 940, the process 900 continues with the SA:SE 720 obtaining decryption key from SA:KM 730 and decrypting the encrypted document to be signed.

At 950, the process 900 continue with the SA:SE 720 conducting the signing process. In an example, the signing process involves rendering the document to the client device, receiving indications of electric signatures or initials applied by the user of the client device, optionally application of a digital signature, and updating of metadata associated with the signing process and document. Once the signing process is completed, the process 900 continues at 960 with the SA:SE 720 encrypting the signed document and updating associated metadata. At 970, the process 900 completes with the SA:SE 720 returning the encrypted document and updated metadata to the cloud-based service platform 710.

Figure 10:
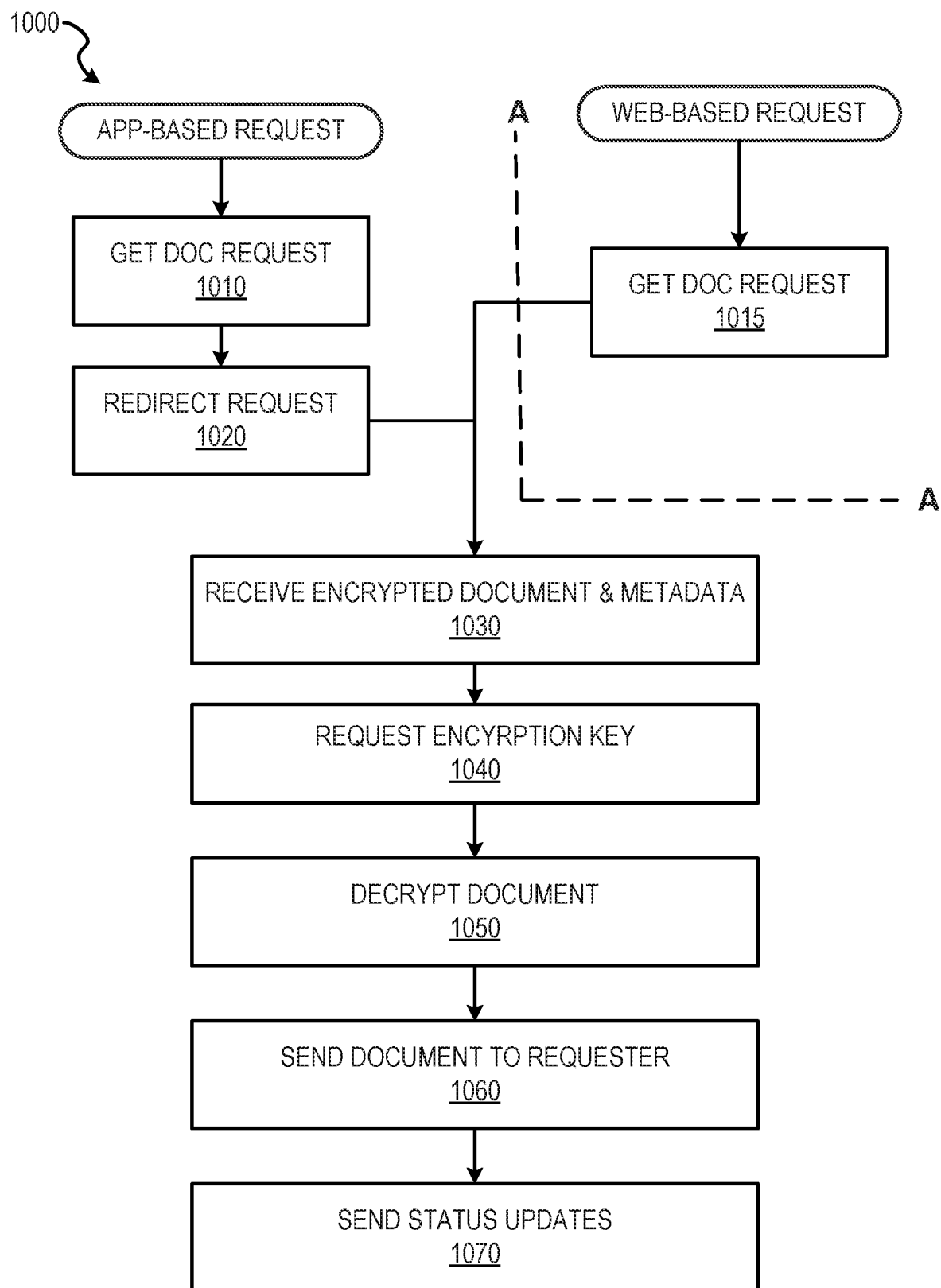
FIG. 10 is a flowchart illustrating a retrieve document process with a cloud-based service, according to some example embodiments.

FIG. 10 is a flowchart illustrating a retrieve document process 1000 with a cloud-based service, according to some example embodiments. The process 1000 involves satisfying a service request to obtain a document being processed or stored within the cloud-based service platform 710 or service appliance, such as within the SA:DS 740. In this example, the process 1000 includes operations such as receiving a get document request at 1010 or 1015, redirecting request at 1020, receiving encrypted document and metadata at 1030, requesting encryption keys at 1040, decrypting the document at 1050, sending document to requester at 1060, and providing status updates at 1070. The process 1000 is illustrated as be initiated from an app-based request or via a web-based request. The difference in this example is where the initial request is handled. With the app-based request, the request is received on the SA:SE 720, and the SA:SE 702 directs the request to the cloud-based service platform 710 for initial processing, such as authentication and retrieval of encrypted document. The web-based request is illustrated as being received directly on the cloud-based service platform 710. As in FIG. 9, the "A" line indicates operations occurring within the cloud-based service platform 710, in this example.

At 1010, the process 1000 can begin with the SA:SE 720 receiving a get document request. Optionally, the process 1000 can begin with the cloud-based service platform 710 receiving the get document request. At 1020, the process 1000 continues with the SA:SE 720 redirecting the get document request up to the cloud-based service platform 710 for initial processing, merging the two options illustrated in FIG. 10. The redirect request can include an envelope ID, which allows the cloud-based service platform 710 to identify the document and associated metadata. The cloud-based service platform 710 can conduct initial authentication of the request and determine where the request needs to be satisfied by the SA:SE 720.

At 1030, the process 1000 continues with the SA:SE 720 receiving the encrypted document and associated metadata from the cloud-based service platform 710. In some example, the encrypted document and metadata may be stored within the SA:DS 740, allowing the cloud-based service platform 710 to merely send document identification information allowing the SA:SE 720 to retrieve the document. At 1040, the process 1000 continues with the SA:SE 720 requesting encryption/decryption keys from the SA:KM 720 to decrypt the document. Optionally, the SA:SE 720 can also conduct secondary authentication of the user requesting the document. Authentications performed by the SA:SE 720 may leverage the local organization's single-sign-on or similar authentication mechanisms.

At 1050, the process 1000 continues with the SA:SE 720 decrypting the document using the keys received from the SA:KM 730. Once the document is decrypted and all required authentications are complete, the process 1000 continues at 1060 with the SA:SE 720 sending the document to the requester. Optionally, the SA:SE 720 can use the requester's public key to secure transmission of the document (or some other transmission related encryption or security protocol). Finally, at 1070, the process 1000 completes with the SA:SE 720 sending status updates to the cloud-base service platform 710.

Figure 11:
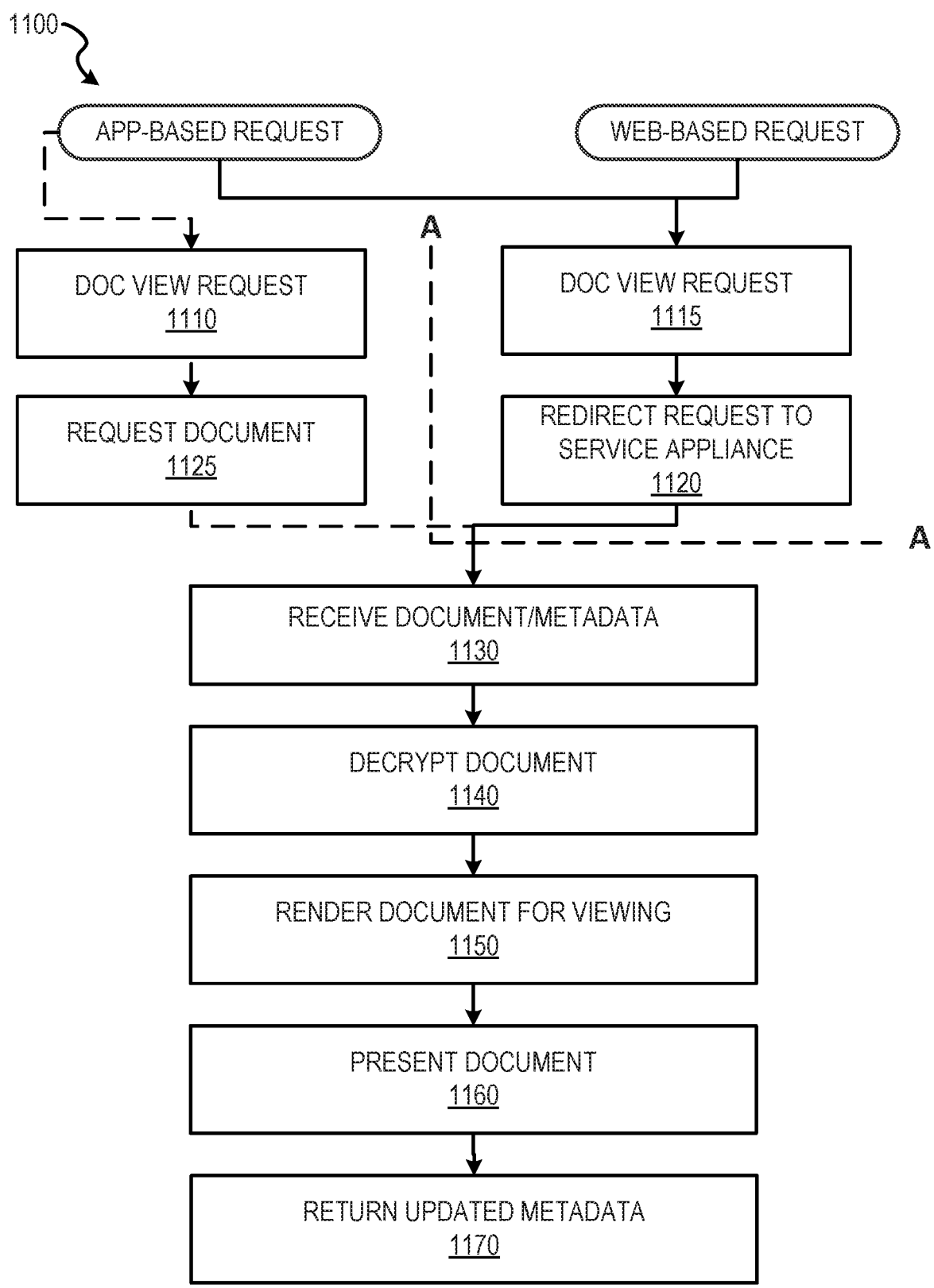
FIG. 11 is a flowchart illustrating a view document process with a cloud-based service, according to some example embodiments.

FIG. 11 is a flowchart illustrating a view document process 1100 with a cloud-based service, according to some example embodiments. In this example, the process 1100 includes operations such as receiving a document view request at 1110 or 1115, requesting document at 1125, redirecting request at 1120, receiving document and metadata at 1130, decrypting document at 1140, rendering document for view at 1150, presenting the document at 1160 and updating and returning metadata as necessary at 1170. Similar to the get document process 1000, the process 1100 can begin directly with the SA:SE 720 (e.g., document view request at 1110) or on the cloud-based service platform 710 (e.g., document view request at 1115). The primary process flow illustrated in FIG. 11 has the request being received on the cloud-based service platform at 1115, with the optional flow starting on the SA:SE 720. In the optional flow, the process 1100 begin at 1110 with the SA:SE 720 receiving a document view request. Optionally, the process 110 continues at 1125 with the SA:SE 720 sending a request for the document to the cloud-based service platform 710. Alternatively, the SA:SE 720 may have sufficient information about the document and its storage location to request the document directly from the SA:DS 740.

At 1115, the primary process 1100 begins with the cloud-based service platform receiving a document view request. At 1120, the process 1100 continues with the cloud-based service platform 710 redirecting the document view request to the SA:SE 720. The redirect can include envelop ID information allowing the SA:SE 720 to retrieve the encrypted document. Optionally, the cloud-based service platform 710 provides an encrypted version of the document and associated metadata as part of the redirect to the SA:SE 720.

At 1130, the process 1100 continues with the SA:SE 720 receiving the document and associated metadata. The process 1100 continues at 1140 with the SA:SE 720 decrypting the document with a key obtained from the SA:KM 730. At 1150, the process 1100 continues with the SA:SE 720 rendering the document for presentation to the requesting end-user via a client device, such as client device 110. At 1160, the process 1100 continues with the SA:SE 720 presenting the document (or representation of the document) to the end user. The process 1100 concludes at 1170 with the SA:SE 720 updating and returning the metadata to the cloud-based service platform 710. The process 1000 and process 1100 involve some similar operations around retrieving the target document; any variations in those operations discussed in reference to processes 1000 and 1100 are equally applicable to the other process.

Modules, Components, and Logic

Certain embodiments are described herein as including logic or a number of components, modules, or mechanisms. Modules may constitute either software modules (e.g., code embodied on a machine-readable medium, such a random access memory used by a hardward processor) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6 are implemented in some embodiments in the context of a machine and an associated software architecture or across multiple machines with architectures along the lines discussed herein. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 12:
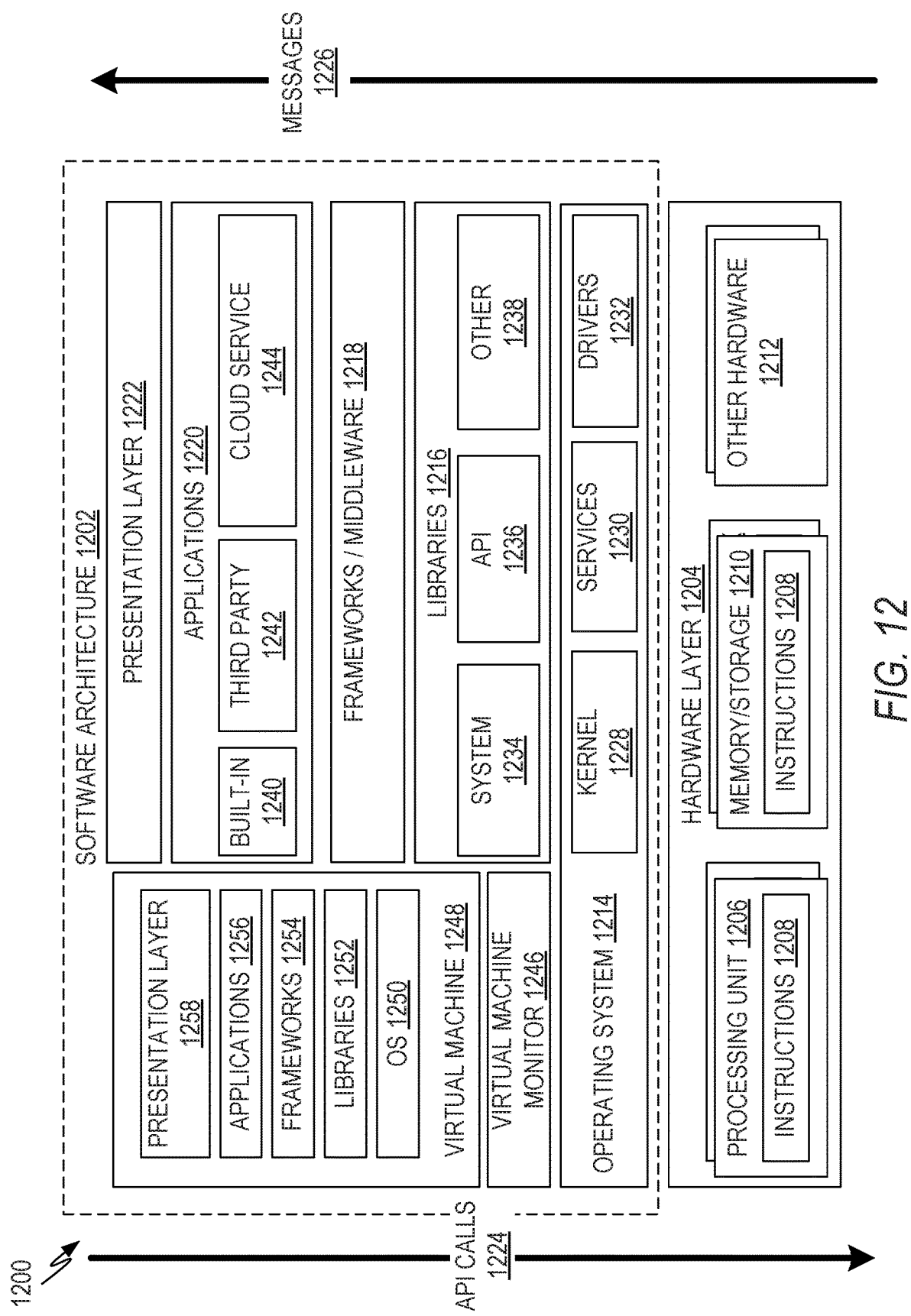
FIG. 12 is a block diagram illustrating an example of a software architecture that may be installed on a machine, according to some example embodiments.

FIG. 12 is a block diagram 1200 illustrating a representative software architecture 1202, which may be used in conjunction with various hardware architectures herein described. FIG. 12 is merely a non-limiting example of a software architecture and it will be appreciated that many other architectures may be implemented to facilitate the functionality described herein. The software architecture 1202 may be executing on hardware such as machine 1300 of FIG. 13 that includes, among other things, processors 1310, memory 1330, and I/O components 1350. A representative hardware layer 1204 is illustrated and can represent, for example, the machine 1300 of FIG. 13. The representative hardware layer 1204 comprises one or more processing units 1206 having associated executable instructions 1208. Executable instructions 1208 represent the executable instructions of the software architecture 1202, including implementation of the methods, modules and so forth of FIGS. 2-11. Hardware layer 1204 also includes memory and/or storage modules 1210, which also have executable instructions 1208. Hardware layer 1204 may also comprise other hardware as indicated by 1212 which represents any other hardware of the hardware layer 1204, such as the other hardware illustrated as part of machine 1300.

In the example architecture of FIG. 12, the software 1202 may be conceptualized as a stack of layers where each layer provides particular functionality. For example, the software 1202 may include layers such as an operating system 1214, libraries 1216, frameworks/middleware 1218, applications 1220 and presentation layer 1222. Operationally, the applications 1220 and/or other components within the layers may invoke application programming interface (API) calls 1224 through the software stack and receive a response, returned values, and so forth illustrated as messages 1226 in response to the API calls 1224. The layers illustrated are representative in nature and not all software architectures have all layers. For example, some mobile or special purpose operating systems may not provide a frameworks/middleware layer 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system 1234 libraries (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 includes built-in applications 1240 and/or third party applications 1242. Examples of representative built-in applications 1240 may include, but are not limited to, a contacts application, a browser application, a book reader application, a location application, a media application, a messaging application, and/or a game application. Third party applications 1242 may include any of the built in applications as well as a broad assortment of other applications. In a specific example, the third party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1242 may invoke the API calls 1224 provided by the mobile operating system such as operating system 1214 to facilitate functionality described herein. In this example, applications 1222 include a cloud service application 1244 that can be configured to communicate directly with one or more service appliances, as well as a cloud-based service platform.

The applications 1220 may utilize built in operating system functions (e.g., kernel 1228, services 1230 and/or drivers 1232), libraries (e.g., system 1234, APIs 1236, and other libraries 1238), frameworks/middleware 1218 to create user interfaces to interact with users of the system. Alternatively, or additionally, in some systems interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware machine (such as the machine of FIG. 13, for example). A virtual machine is hosted by a host operating system (operating system 1214 in FIG. 13) and typically, although not always, has a virtual machine monitor 1246, which manages the operation of the virtual machine as well as the interface with the host operating system (i.e., operating system 1214). A software architecture executes within the virtual machine such as an operating system 1250, libraries 1252, frameworks/middleware 1254, applications 1256 and/or presentation layer 1258. These layers of software architecture executing within the virtual machine 1248 can be the same as corresponding layers previously described or may be different.

Example Machine Architecture and Machine-Readable Medium

Figure 13:
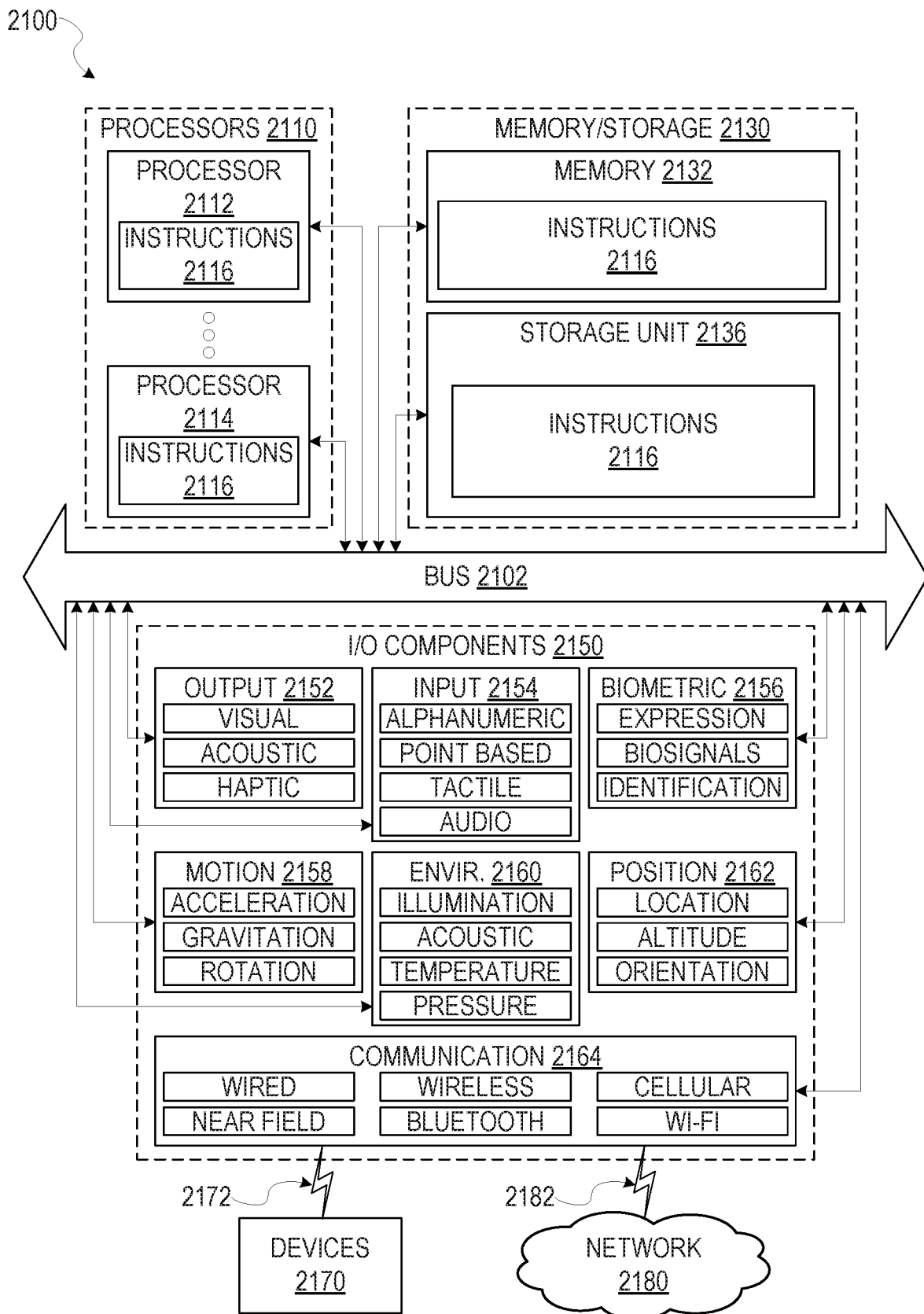
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example the instructions may cause the machine to execute the flow diagrams of FIGS. 4-6 and 8-11. Additionally, or alternatively, the instructions may implement coordination service modules such as service module, coordination module, communication module, appliance selection module, and policy module as well as service appliance modules such as service module, coordination module, communication module, data management module and policy module of FIGS. 2 and 3, and so forth. The instructions transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method for protecting data within a cloud-based service platform, the method comprising:

establishing a service session between a cloud computing system and a first client associated with an electronic document, the service session established in response to a service request received from the first client and in response to determining that the electronic document is not a sensitive document, the first client associated with an account on the cloud-based service platform;

in response to the electronic document becoming a sensitive document, switching from the cloud computing system to a local server system for use during a remainder of the service session; and upon switching to the local server system, controlling a sequence of operations performed by the local server system to satisfy the service request received from the first client, wherein the sequence of operations includes requesting and receiving a digital or electronic signature on the electronic document from a signor identified within the service request.

2. The method of claim 1, wherein controlling the sequence of operations includes exchanging metadata associated with the service request between the local server system and the first client.

3. The method of claim 1, wherein controlling the sequence of operations includes communicating a service protocol to the local server system to control performance of the service request.

4. The method of claim 3, wherein the service protocol defines a sequence of operations, actors, communication parameters, and security requirements associated with the service request.

5. The method of claim 1, wherein the service session is established between the cloud computing system and the first client based on one or more of a status associated with the service request and an operation associated with the service request.

6. The method of claim 5, wherein the operation comprises one or more of a document handling operation and a data control operation.

7. The method of claim 1, wherein the electronic document becomes a sensitive document in response to an addition of sensitive information to the electronic document or in response to a classification of information within the electronic document as sensitive.

8. A system for protecting data within a cloud-based service platform, the system comprising:
a hardware processor; and
a non-transitory computer-readable storage medium storing executable instructions that, when executed by the hardware processor, cause the hardware processor to perform steps comprising:
establishing a service session between a cloud computing system and a first client associated with an electronic document, the service session established in response to a service request received from the first client and in response to determining that the electronic document is not a sensitive document, the first client associated with an account on the cloud-based service platform;
in response to the electronic document becoming a sensitive document, switching from the cloud computing system to a local server system for use during a remainder of the service session; and
upon switching to the local server system, controlling a sequence of operations performed by the local server system to satisfy the service request received from the first client, wherein the sequence of operations includes requesting and receiving a digital or electronic signature on the electronic document from a signor identified within the service request.

9. The system of claim 8, wherein controlling the sequence of operations includes exchanging metadata associated with the service request between the local server system and the first client.

10. The system of claim 8, wherein controlling the sequence of operations includes communicating a service protocol to the local server system to control performance of the service request.

11. The system of claim 10, wherein the service protocol defines a sequence of operations, actors, communication parameters, and security requirements associated with the service request.

12. The system of claim 8, wherein the service session is established between the cloud computing system and the first client based on one or more of a status associated with the service request and an operation associated with the service request.

13. The system of claim 12, wherein the operation comprises one or more of a document handling operation and a data control operation.

14. The system of claim 8, wherein the electronic document becomes a sensitive document in response to an addition of sensitive information to the electronic document or in response to a classification of information within the electronic document as sensitive.

15. A non-transitory computer-readable storage medium storing executable instructions for protecting data within a cloud-based service platform, the instructions, when executed by a hardware processor, configured to cause the processor to perform steps comprising:
establishing a service session between a cloud computing system and a first client associated with an electronic document, the service session established in response to a service request received from the first client and in response to determining that the electronic document is not a sensitive document, the first client associated with an account on the cloud-based service platform;
in response to the electronic document becoming a sensitive document, switching from the cloud computing system to a local server system for use during a remainder of the service session; and
upon switching to the local server system, controlling a sequence of operations performed by the local server system to satisfy the service request received from the first client, wherein the sequence of operations includes requesting and receiving a digital or electronic signature on the electronic document from a signor identified within the service request.

16. The non-transitory computer-readable storage medium of claim 15, wherein controlling the sequence of operations includes exchanging metadata associated with the service request between the local server system and the first client.

17. The non-transitory computer-readable storage medium of claim 15, wherein controlling the sequence of operations includes communicating a service protocol to the local server system to control performance of the service request.

18. The non-transitory computer-readable storage medium of claim 17, wherein the service protocol defines a sequence of operations, actors, communication parameters, and security requirements associated with the service request.

19. The non-transitory computer-readable storage medium of claim 15, wherein the service session is established between the cloud computing system and the first client based on one or more of a status associated with the service request and an operation associated with the service request.

20. The non-transitory computer-readable storage medium of claim 15, wherein the electronic document becomes a sensitive document in response to an addition of sensitive information to the electronic document or in response to a classification of information within the electronic document as sensitive.

* * * * *